Dec. 7, 1926.                                                    1,609,486
                            D. MARINSKY
                          FASTENING DEVICE
                         Filed Jan. 22, 1925
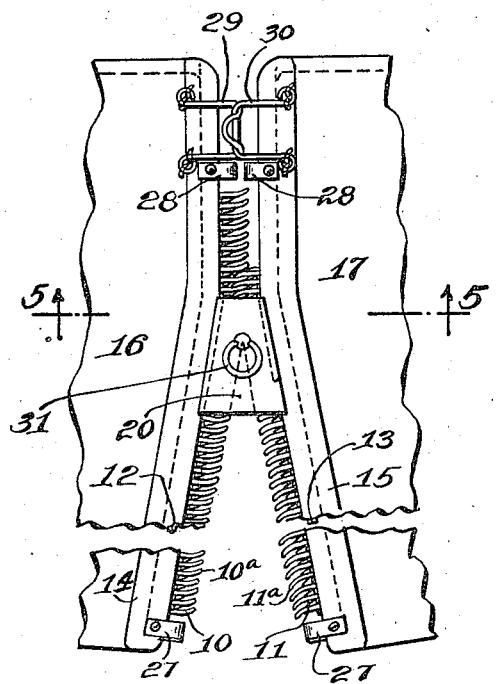
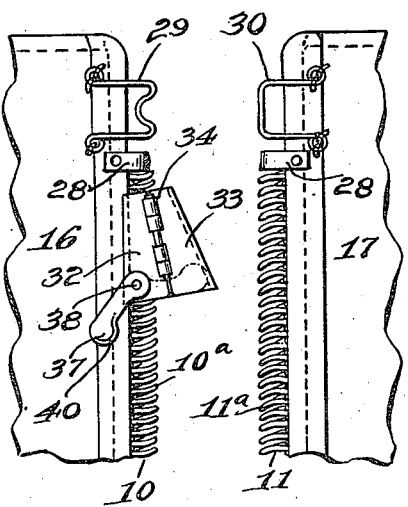
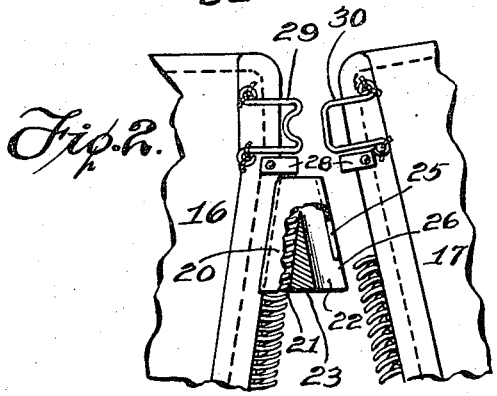
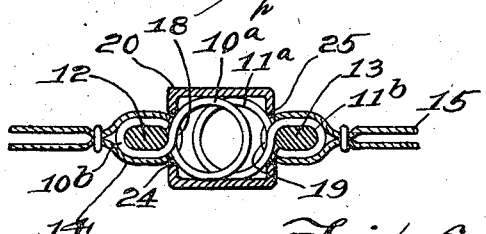
INVENTOR
Davis Marinsky
BY
Howard E. Thompson
ATTORNEY Patented Dec. 7, 1926.

1,609,486

UNITED STATES PATENT OFFICE.

DAVIS MARINSKY, OF BRONX, NEW YORK.

FASTENING DEVICE.

Application filed January 22, 1925. Serial No. 3,923.

This invention relates to fastening devices and particularly to devices of this class employing two parts or bodies independent of each other and adapted to be secured to independent supports for quickly and easily coupling said supports together and also for uncoupling the same; and the object of the invention is to provide a device of the class specified, employing means for coupling the separate parts or bodies of the fastening device together and to couple and uncouple the same; a further object being to provide means for coupling the separate garment parts or other supports together and to hold the same in position to facilitate the coupling and uncoupling of the separate parts of the fastening device; a further object being to provide a fastening device of the class described, one of the parts of which is of greater length than the other, especially in respect to the interlocking members of the separate parts, thereby facilitating the coupling and uncoupling of said parts; and with these and other objects in view, the invention consists in a device of the class and for the purpose specified, which is simple in construction, efficient in use, and which is constructed and operated as hereinafter described and claimed.
The invention is fully disclosed in the following specification, of which the accompanying drawing forms a part, in which the separate parts of my improvement are designated by suitable reference characters in each of the views, and in which:—

Fig. 1 is a plan view of a part of a predetermined article or apparel, showing one form of my improved fastening device mounted in connection therewith and with part of the construction broken away.

Fig. 2 is a view similar to Fig. 1 but showing the parts in a different position and with part of the construction in section.

Fig. 3 is a view similar to Fig. 2 but showing a modification.

Fig. 4 is a detail view of one end portion of a coupling block shown in Fig. 3.

Fig. 5 is a partial section on the line 5—5 of Fig. 1 and on an enlarged scale; and, Fig. 6 is a detail view of a part of an attaching strip which I employ.

In the construction shown in Figs. 1 and 2 of the drawing, I provide a fastening device employing two independent parts 10 and 11, each of said parts having a plurality of equally spaced interlocking members 10$^a$ and 11$^a$ preferably hook-shaped in form when viewed edgewise and loop-shaped in form when viewed in plan as seen in Fig. 5 of the drawing, said members being preferably provided with loops 10$^b$ and 11$^b$ mounted upon strands 12 and 13 respectively for supporting the same in spaced relation as clearly shown and described in co-pending applications filed by me January 21, 1925, Serial Numbers 3738 and 3739. The strands 12 and 13 serve to couple the separate members in each part 10 and 11 together and to maintain said members in spaced relation, and as shown and described in said co-pending applications, the strands 12 and 13 and the loops 10$^b$ and 11$^b$ thereon are enclosed in attaching strips 14 and 15 respectively which constitutes casings or jackets therefore and facilitates the mounting of the parts 10 and 11 in connection with supports 16 and 17 respectively.

A part of one of the strips, the strip 14, is shown in plan in Fig. 6 of the drawing and is composed of a suitable piece of fabric or other flexible material having arranged thereon spaced apertures 18 through which the members 10$^a$ and 11$^a$ are adapted to pass, it being understood that the strip 15 is provided with similar apertures 19, and the spacing of the apertures 18 and 19 will correspond to the spacing of the members 10$^a$ and 11$^a$.

In the construction shown in Figs. 1 and 2, the part 10 of the fastening device is of greater length than the part 11 or rather the part 10 is provided with a greater number of members 10$^a$ than the number of members 11$^a$ employed on the latter part, and in the use of the device, a coupling block 20 is employed for coupling the parts 10 and 11 together, said block being substantially V-shaped in form and provided with two bores 21 and 22 which intersect and open outwardly through the small end of the block 20 and are divided by a V-shaped partition 23 at the large end thereof, see Fig. 2 of the drawing, and the side walls of the block 20 are recessed as indicated at 24 and 25 in Fig. 5 of the drawing to permit of the passage of the parts 10 and 11 therethrough, and the recess 25 in the block 20 is enlarged adjacent the large end portion of said block as shown at 26 to permit the passage of the part 11 laterally into the bore 22 as will be clearly seen on a consideration of Fig. 2 of the drawing. In practice, and after the block 20 has been mounted in position and the parts 10 and 11 secured to the supports 16 and 17, stop members 27 are secured to one end portion of each of the parts 10 and 11 and to the respective supports therefor, while other stop members 28 are secured to said parts adjacent the other end portion thereof, it being noted on a consideration of Figs. 1 and 2 of the drawing that the latter stops 28 are secured one adjacent the last member 10ª on said end portion of the part 10, and the other is located a predetermined distance away from the last member 11ª on said end portion of the part 11, and the space between the last named stop 28 and the member 11ª is substantially equal to the distance between the small end of the block 20 and the enlargement 26 of the bore 22 formed therein, permitting the insertion of a predetermined number of the members 11ª into the block 20 when the same is adjacent the stops 28.

It is also preferred that the supports 16 and 17 be coupled together by hook members 29 and 30 on the respective supports or coupled together in any other desired manner to retain said supports in predetermined relation one with reference to the other, but these hook members are not absolutely necessary as the parts 10 and 11 may be coupled together and interlocked by proper manipulation of the block 20, it being understood that any means may be employed for preventing the separation of the parts 10 and 11 adjacent the stops 28. In the use of the device shown in Figs. 1 and 2 of the drawing, it will be understood that in coupling the garment parts or other supports 16 and 17 together, the block 20, which is always in engagement with the part 10, is moved adjacent the stop 28 on said part as shown in Fig. 2 and the members 11ª of the part 11 are passed into the bore 22 through the enlargement 26 with the stop 28 on the part 11 held in engagement with the upper or reduced end of the block 20, after which the block 20 is moved downwardly, which operation automatically moves the parts 10 and 11 into engagement to interlock the members 10ª and 11ª one with the other in the manner partially illustrated in Fig. 1 of the drawing. If the hook members 29 and 30 are employed, the same are first hooked together to hold the supports 16 and 17 against separation in the operation of inserting the members 11ª into the bore 22, and in some uses of my invention, the hook members 29 and 30 will be practical and useful. The manipulation of the block 20 can be facilitated by employing a suitable finger piece 31.

In the construction shown in Figs. 3 and 4 of the drawing, I have shown a modified form of coupling block 32 employed for coupling the separate parts 10 and 11 together, and in this construction the same number of members 10ª and 11ª are employed on the separate parts or in other words that portion of said parts is substantially of the same length rather than of different lengths as shown in Figs. 1 and 2; and to provide for the attachment and detachment of the parts 10 and 11, the block 32 which is of the same general form as the block 20, is provided with a movable top side portion 33 hinged as shown at 34 to the other or fixed side portion or to the block as a whole whereby the portion 33 which constitutes a lock plate may be moved into a raised position as illustrated in dotted lines in Fig. 4 of the drawing, to permit the passage of the part 11 into the recess or bore 35 formed in said side portion of the block 32, it being understood that the part 10 is normally retained in the recess or bore 36 in the other side portion of said block when the fastening device is in use. I also employ a lock lever 37 pivoted to the block as shown at 38 and the free end portion of which is adapted to be swung upon the plate 33 as indicated in dotted lines in Fig. 3 of the drawing to hold said plate in closed position, and the lever 37 is preferably provided with a raised lip 40 to facilitate the movement thereof into operative and inoperative positions.

With the construction shown in Figs. 3 and 4 of the drawing, the parts 10 and 11 are coupled together by first engaging the hook members 29 and 30 and moving the block 32 adjacent the stop 28, then raising the plate 33 and inserting the part 11 after which the plate is closed, and the block 32 may now be moved longitudinally of the separate parts 10 and 11 to couple and uncouple the same in securing the supports 16 and 17 together and in separating said supports. It will also be understood however, that while the block 32 must be moved adjacent one end portion of the separate parts 10 and 11 to couple said parts together, said parts may be dissected at any position the block may assume on the fastening device, by simply raising the plate 33 to release the part 11, uncoupling the hook devices 29 and 30 and separating said parts by a lateral pull from either end portion thereof.

It will be noted with applicant's construction that the end of the attaching device where the separate parts are first coupled together is shown at the top of the sheet, while the end which is last coupled together is at the bottom of the sheet in the several figures. For the purpose of description, the end which is first coupled together by the slide member will be called the upper end, and the other, the lower end; it being understood, however, that in the use of the device, upper and lower has no specific meaning.

My invention is adapted primarily for use in coupling two or more bodies or supports of any kind or class, such for example as the end portions of a corset, brassière, leggings, the flaps of an overshoe and the like, and as will be apparent may be used for coupling two totally independent and unconnected or related parts together, means being employed for coupling the separate parts of the fastening device together to permit of the interengagement of the interlocking members thereof. It will also be understood that I am not necessarily limited to the specific form and construction of the separate parts 10 and 11 of the fastening device herein shown and described, and especially in the formation of the members 10ª and 11ª thereof and the method of said mounting, and various other changes in and modifications of the construction herein shown and described may be made within the scope of the appended claims without departing from the spirit of my invention or sacrificing its advantages.

Having fully described my invention, what I claim as new and desire to secure by Letters Patent, is:—

1. A fastening device of the class described employing two independent parts adapted to be coupled and interlocked one with the other, and the interlocking portion of one of said parts being of less length than the corresponding portion of the other part to form a space at one end of said short part, means for detachably coupling said parts together, said means being movable longitudinally of said parts to interlock the same throughout their length, the longitudinal dimension of said means being greater than the length of said space, said means including means whereby the parts may be coupled and uncoupled, and means for limiting the movement of said first named means in both directions on both of said parts.

2. A separable fastening device comprising two independent parts having interlocking portions whereby said parts may be coupled and uncoupled, the arrangement of the interlocking portions on one of said parts being shorter than on the other of said parts to form a space at one end of the first named part, a member of greater length than said space and slidably engaging said parts for coupling and uncoupling the same, and said member being provided at one side with a recess of such dimensions as to permit lateral displacement of the first named or short part from said member.

3. A separable fastening device comprising two independent parts having interlocking portions whereby said parts may be coupled and uncoupled, the arrangement of the interlocking portions on one of said parts being shorter than on the other of said parts to form a space at one end of the first named part, a member of greater length than said space and slidably engaging said parts for coupling and uncoupling the same, said member being provided at one side with a recess of such dimensions as to permit lateral displacement of the first named or short part from said member, and means at both end portions of said parts for limiting the movement of said member thereon, and an attaching device on said parts for coupling the same together independent of said member.

4. A separable fastening device comprising two parts provided with coupling elements, the arrangement of said elements on one of said parts being shorter than on the other part, the elements of said parts being adapted to interlock in coupling said parts together, a slide member movable longitudinally on both of said parts for coupling and uncoupling the elements thereof, said parts being provided at their opposite ends with stop devices for limiting the movement of said member on both of said parts, the elements of said parts being in engagement with said member when in both extreme movements thereof, and said member having a recess at one side thereof whereby the elements of one of said parts, the arrangement of which is shorter than the elements of the other part, may be removed laterally through said member in the separation of said parts.

5. A separable fastening device comprising two parts provided with coupling elements, the arrangement of said elements on one of said parts being shorter than on the other part, the elements of said parts being adapted to interlock in coupling said parts together, a slide member movable longitudinally on both of said parts for coupling and uncoupling the elements thereof, said parts being provided at their opposite ends with stop devices for limiting the movement of said member on both of said parts, the elements of said parts being in engagement with said member when in both extreme movements thereof, said member having a recess at one side thereof whereby the elements of one of said parts, the arrangement of which is shorter than the elements of the other part, may be removed laterally through said member in the separation of said parts, and means outwardly of the stops at one end of said parts for detachably coupling sid parts together independent of said member.

6. A separable fastening device comprising two parts provided with interengaging coupling elements, a member slidably engaging said parts for coupling and uncoupling the elements thereof, said member being in engagement with said elements when in both extreme movements thereof, the elements collectively on one of said parts being shorter in length than on the other of said parts, and said member being recessed to permit of the separation of the part having the short arrangement of elements thereon laterally through said member when said slide member is at one end of said parts.

7. A separable fastening device comprising two parts, each part comprising a plurality of coupling elements fashioned from wire to form two loop portions, a flexible strand passed through one of the loops of said elements and to which said elements are secured with the loops mounted on said strand in juxtaposition and with the other loops thereof in spaced relation and common alinement, an attaching member encircling the strand and the loops on said strand, a slide member movable longitudinally of both of said parts and adapted to couple and uncouple the projecting loops of said elements, the arrangement of elements collectively on one of said parts being shorter in length than on the other of said parts to form a space thereon, and said member being of greater length than said space and having a recess at one side thereof whereby the shorter arrangement of loops may be removed laterally through said member in the separation of said parts.

8. A separable fastening device comprising two parts, each part comprising a plurality of coupling elements fashioned from wire to form two loop portions, a flexible strand passed through one of the loops of said elements and to which said elements are secured with the loops mounted on said strand in juxtaposition and with the other loops thereof in spaced relation and common alinement, an attaching member encircling the strand and the loops on said strand, a slide member movable longitudinally of both of said parts and adapted to couple and uncouple the projecting loops of said elements, the arrangement of elements collectively on one of said parts being shorter in length than on the other of said parts to form a space thereon, and said member being of greater length than said space and having a recess at one side thereof whereby the shorter arrangement of loops may be removed laterally through said member in the separation of said parts, stops at the end portions of said parts for limiting the movement of said member thereon, and a coupling device for coupling said parts together independent of said member and for retaining said parts in proper alinement.

9. A separable fastening device comprising two parts provided with interengaging coupling elements, a member slidably engaging said parts for coupling and uncoupling the elements thereof, the arrangement of coupling elements on one of said parts being shorter than on the other to form a blank space on one part adjacent the upper end thereof, said member being of greater length than said space and including means whereby when said member is moved to the extreme upper end of one of the parts, the shorter arrangement of coupling elements may be detached to separate the separate parts of the fastener.

10. A separable fastening device comprising two parts provided with interengaging coupling elements, a member slidably engaging said parts for coupling and uncoupling the elements thereof, the arrangement of coupling elements on one of said parts being shorter than on the other to form a blank space on one part adjacent the upper end thereof, said member being of greater length than said space and including means whereby when said member is moved to the extreme upper end of one of the parts, the shorter arrangement of coupling elements may be detached to separate the separate parts of the fastener, and means for limiting the upward and downward movement of the slider on said parts.

11. A separable fastening device comprising two parts provided with interengaging coupling elements, a member slidably engaging said parts for coupling and uncoupling the elements thereof, the arrangement of coupling elements on one of said parts being shorter than on the other to form a blank space on one part adjacent the upper end thereof, said member being of greater length than said space and including means whereby when said member is moved to the extreme upper end of one of the parts, the shorter arrangement of coupling elements may be detached to separate the separate parts of the fastener, means for limiting the upward and downward movement of the slider on said parts, and means at the upper end of said parts for coupling the same together independent of said member.

12. A separable fastening device comprising two straingers having interlocking elements, a slide member having diverging channels in which said elements are adapted to operate in the movement of said member longitudinally of the stringers, one of said stringers being retained against displacement from one of the channels in said slide member by stops at the ends of said stringer, and means independent of the slide member for coupling said stringers together, and the elements of the other of said stringers when the slide member is at one end of the first named stringer being adapted to be brought into juxtaposition to said stringer and in alinement with the other channel of the slide member by said means, and to be coupled with the elements of the first named stringer in the operation of moving the slide member to the opposite end of the stringers in coupling said stringers together.

In testimony that I claim the foregoing as my invention I have signed my name this 21st day of Jan., 1925.

DAVIS MARINSKY.